No. 856,554. PATENTED JUNE 11, 1907.
G. STOCKHILL.
REIN HOLDER.
APPLICATION FILED MAR 4, 1907.

Witnesses
W. H. Rockwell
M. J. Miller

Inventor
George Stockhill
By Chandler Chandler
Attorneys

UNITED STATES PATENT OFFICE.

GEORGE STOCKHILL, OF FORT KEOGH, MONTANA.

REIN-HOLDER.

No. 856,554. Specification of Letters Patent. Patented June 11, 1907.

Application filed March 4, 1907. Serial No. 360,407.

*To all whom it may concern:*

Be it known that I, GEORGE STOCKHILL, a citizen of the United States, residing at Fort Keogh, in the county of Custer, State of Montana, have invented certain new and useful Improvements in Rein-Holders; and I do hereby declare the following to be a full, clear, and exact description of the invention, such as will enable others skilled in the art to which it appertains to make and use the same.

This invention has for its object the provision of a holder for the reins of harness that shall be adapted to be readily and firmly secured to the dashboard or on a side of the forward part of the vehicle body, and in which the reins can be easily and quickly placed and there securely held.

The nature of the invention is ascertainable from the device portrayed in the annexed drawings, forming a part of this specification, in view of which the invention will first be described with respect to its construction and mode of use, and then be pointed out in the subjoined claims.

Figure 1:
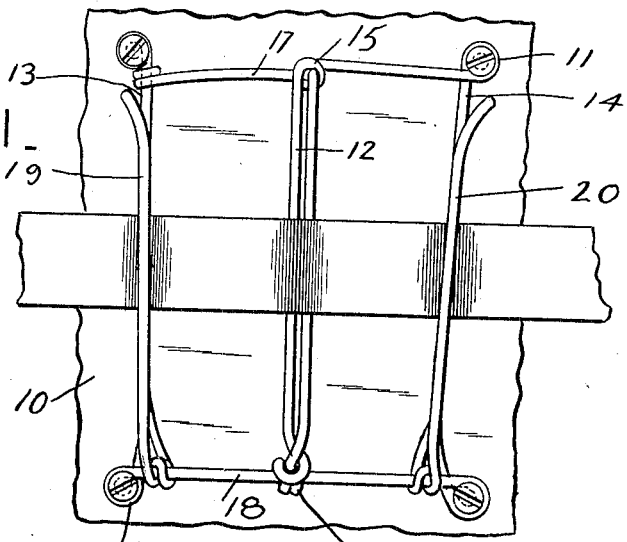
Figure 2:
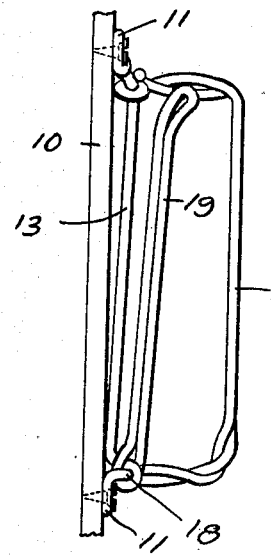
Figure 3:
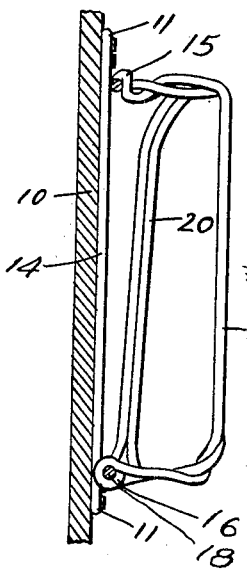
Figure 4:
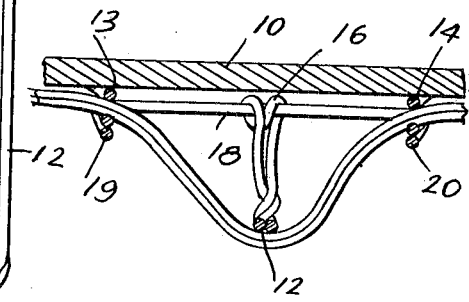

Of the said drawings—Figure 1 is a front elevation. Fig. 2 is a side view. Fig. 3 is a vertical longitudinal section. Fig. 4 is a transverse section showing the position of the reins in the holder.

Similar numerals of reference designate similar parts or features, as the case may be, wherever they occur.

My improved rein-holder is composed entirely of a length of wire bent to form the parts and features of the construction. In said construction 10 designates a base provided at the corners with eyes 11 for the reception of the shanks of fastening screws by which the frame may be secured to the dashboard or other part of a vehicle.

12 designates a bar composed of doubled portions of the length of wire, which bar is disposed centrally of the sides 13 and 14 of the frame and is offset from the latter by right angular bends 15 and 16 at the ends of said bar, the inner ends of the said angular offset bends being connected with the top and bottom wires 17 and 18 of the frame. The form and construction of the central bar 12 renders it relatively rigid.

19 and 20 designate spring fingers composed of doubled portions of wire, connected with the bottom frame wire 18 and coiled thereabout, as shown. The said fingers extend up over the side wires 13 and 14 of the frame to, or near to, the top frame wire 17, but in a plane nearer the base than the central bar 12.

With this construction, the driver of a horse or team, having the invention secured in proper position on the vehicle, upon stopping the team may pass the portion of the reins in his hands down between the spring fingers 19 and 20 and the side frame wires 13 and 14 with an outwardly bent portion extending over the central offset bar 12, and then by drawing slightly on the loose ends of the reins he will tighten them with requisite security, and in clamped position in the rein-holder so that they will not become loosened and fall under the feet of the horses, while they are standing.

Should occasion require for the driver or other person to get hold of the reins quickly to control or hold the horse or team, the ends will be in position where they can readily be reached and by taking hold of them and pulling upward slightly thereon they will be instantly released from the holder and be in position, without any entanglement for use as desired.

It is necessary that the spring fingers 19 and 20 should be only slightly resilient to render them efficient in the performance of their functions as clamping means. Indeed, if they were rigid they would subserve their purposes well enough in most cases, but not quite so well as where they are made slightly resilient.

By my improvement a very simple and quite efficient rein-holder is provided that will obviate the necessity of wrapping the reins about the whip in the whip stock or dropping them over the sides of the dash, or on the floor of the carriage-body, and avoid the inconvenience and danger of such doing.

What is claimed is—

A rein-holder consisting entirely of wire, and comprising a rectangular base having eyes at its corners, a central bar offset from the base and connected therewith at both ends, and spring fingers connected with the base at their lower ends, and extended up on the opposite sides of the central bar on a plane nearer the base than the central bar, the upper ends of the fingers being free.

In testimony whereof, I affix my signature, in presence of two witnesses.

GEORGE STOCKHILL.

Witnesses:
S. FRED CALE,
THOMAS WEAR.